United States Patent [19]

Shelhorse

[11] Patent Number: 4,890,657
[45] Date of Patent: Jan. 2, 1990

[54] APPARATUS AND METHOD FOR EMPLOYING A PORTABLE WORKSHOP

[75] Inventor: Dennis Shelhorse, Sayville, N.Y.

[73] Assignee: The Shelhorse Corporation, Sayville, N.Y.

[21] Appl. No.: 285,654

[22] Filed: Dec. 16, 1988

[51] Int. Cl.⁴ .......................... B27B 1/00; B27M 1/00; B27H 1/00

[52] U.S. Cl. .................... 144/363; 83/471.3; 83/574; 144/134 R; 144/136.12; 144/286.12; 144/371

[58] Field of Search .......... 144/134 R, 134 D, 136 R, 144/136 C, 286 R, 286 A, 363, 371; 83/471.1, 471.3, 467 R, 574

[56] References Cited

U.S. PATENT DOCUMENTS

| 2,605,790 | 8/1952 | Schwarzer | 144/27 |
|---|---|---|---|
| 3,586,079 | 6/1979 | Collins et al. | 144/35 |
| 3,770,031 | 11/1973 | Olson | 144/136 |
| 3,815,463 | 6/1974 | Allaire | 83/460 |
| 3,841,368 | 10/1974 | Ritter | 144/144 R |
| 3,866,496 | 2/1975 | Payne et al. | 83/471.3 |
| 4,114,664 | 9/1978 | Cotton | 144/144 R |
| 4,152,961 | 5/1979 | Batson | 83/471.3 |
| 4,155,383 | 5/1979 | Welliver | 144/134 D |
| 4,215,731 | 8/1980 | Maynard | 144/134 D |
| 4,281,694 | 8/1981 | Gorman | 144/134 D |
| 4,299,263 | 11/1981 | Skinner | 144/134 D |
| 4,305,439 | 12/1981 | Skinner | 144/134 D |
| 4,353,672 | 10/1982 | Smith | 144/134 D |
| 4,448,102 | 5/1984 | Thornton | 83/471.1 |
| 4,452,117 | 6/1984 | Brickner et al. | 83/467 R |

Primary Examiner—W. Donald Bray
Attorney, Agent, or Firm—Stanley Ira Laughlin

[57] ABSTRACT

The invention relates to apparatus and methods for the operation of a portable workshop over workpieces comprising arms for clamping said workpieces, a first pair of guides supported upon said arms, a plurality of circular rims positioned within each other for rotatable movement upon said guides relative to each other, and a second pair of guides affixed to the innermost circular rim to form a turntable for the operation of portable electrical tools.

13 Claims, 4 Drawing Sheets

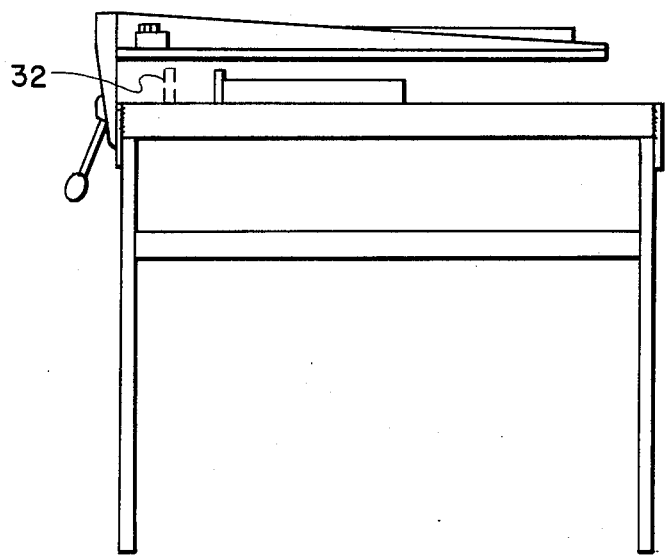
FIGURE 4
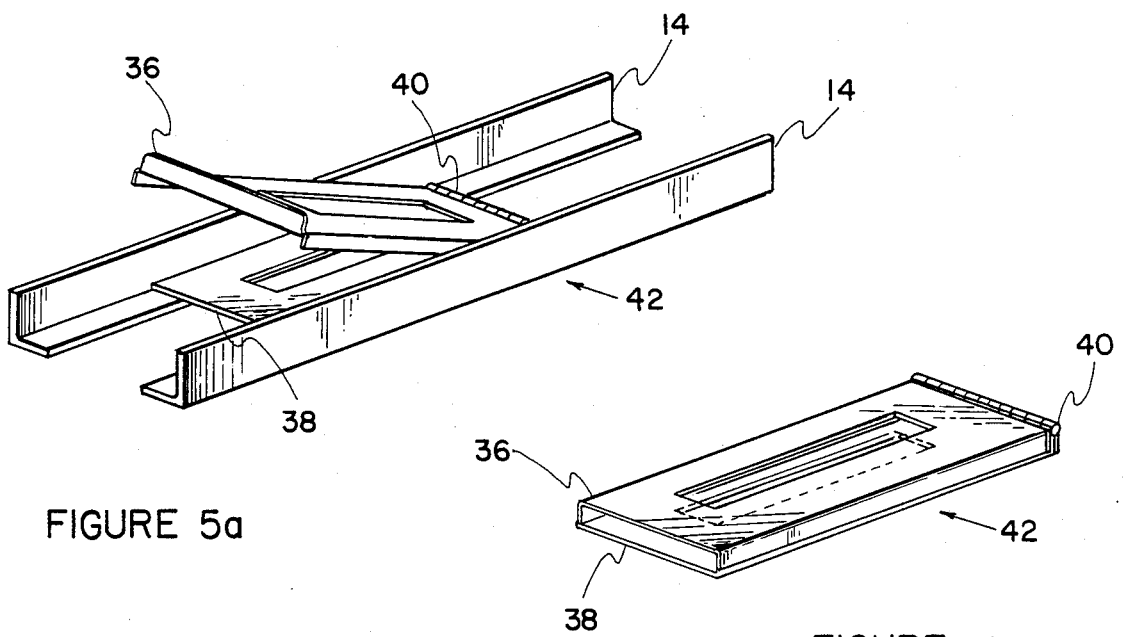
FIGURE 5a
FIGURE 5b

APPARATUS AND METHOD FOR EMPLOYING A PORTABLE WORKSHOP

BACKGROUND OF THE INVENTION

The invention relates to apparatus and method for performing sawing, milling and other workshop operations with portable tools, such as electrical circular saws, routers, saber saws and the like usually done with radial arm saws and more particularly those workshop operations described in classes 83 and 144.

Portable electrical circular saws have been known to be used with mitre boxes such as taught in U.S. Pat. No. 3,815,436 and 4,448,102 to Allaire and Thornton respectively.

Portable electrical circular saws employed in cutting vertically positioned sheetboard such as taught in U.S. Pat. No. 3,866,496 to Payne et al are also well known.

The objective of Applicant's invention is to provide portable apparatus and methods of using portable electrical tools such as circular saws, routers, saber saws, etc to perform, without limitation, every workshop operation economically, safely and reliably.

SUMMARY OF THE INVENTION

Applicant's invention relates to apparatus and methods adapting portable electric tools such as circular saws, routers, saber saws and the like to provide continuously rotatable cutting, mitering and milling of workpieces comprising vertically moveable cantilever arms to clamp workpieces, a first pair of rails upon said cantilever arms, moveable turntables positioned upon said first pair of rails, a second pair of rails supported upon said turntables, electrical tools moveably positioned upon said second pair of rails above the workpiece being cut.

DESCRIPTION OF THE DRAWINGS

FIG. 4 is a side elevation view of the structure shown in FIGS. 2 and 3.

FIGS. 5 are isometric views of an hinged accessory equipment employed with the portable workshop shown in the foregoing figures.

FIG. 5a shows the piece of equipment in its open position.

FIG. 5b shows it in its closed or compressed position.

DETAILED DESCRIPTION

Figure 1:
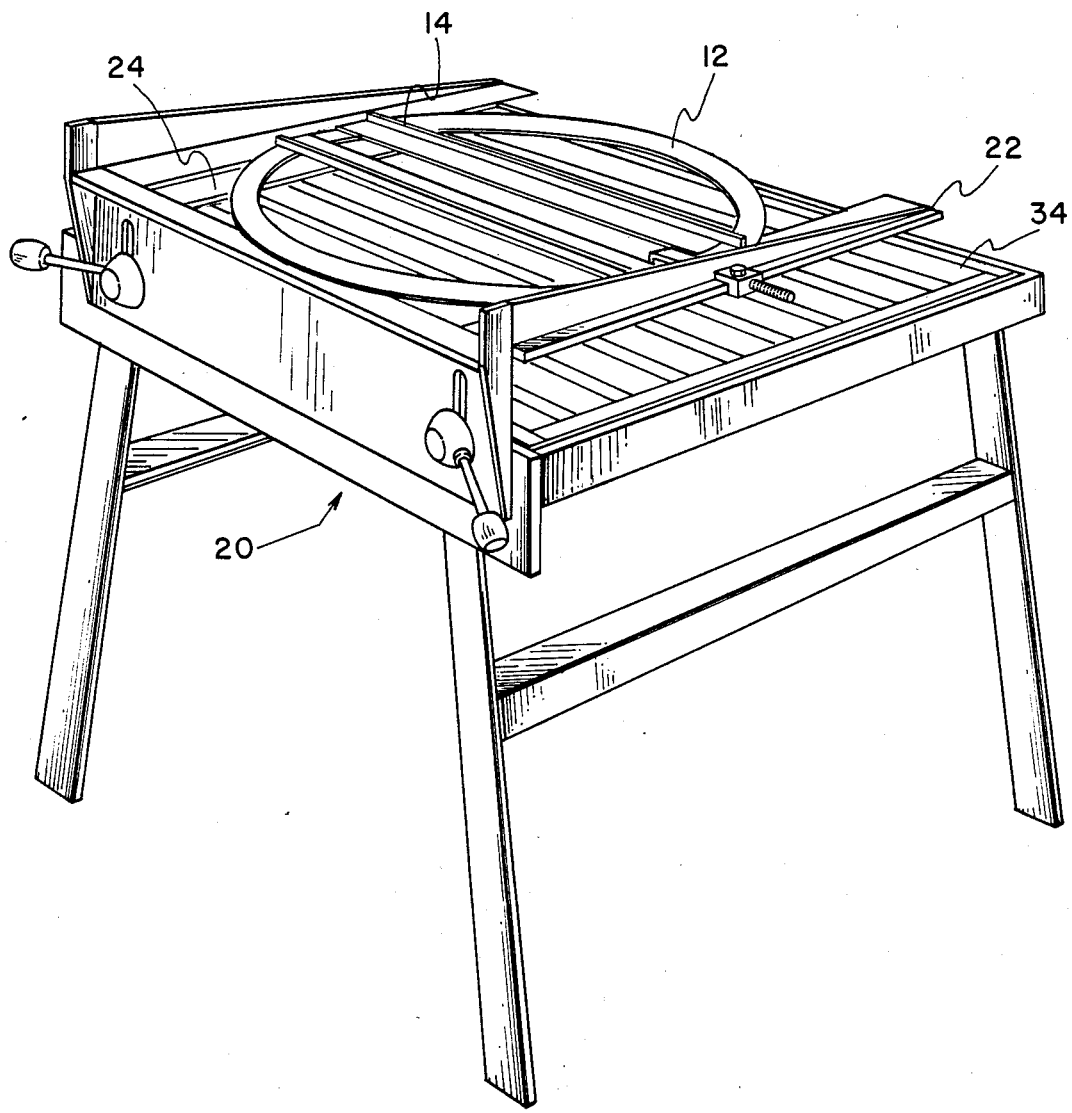
FIG. 1 is a isometric view looking from the rear of said invention.
Figure 2:
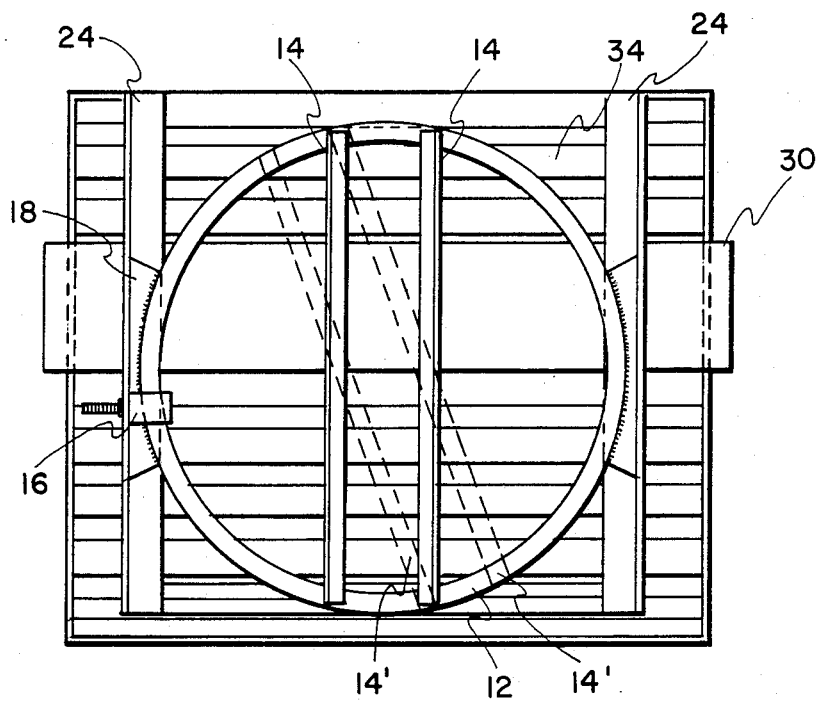
FIG. 2 is a plan view of Applicant's invention employed in conjunction with a workbench.
Figure 3:
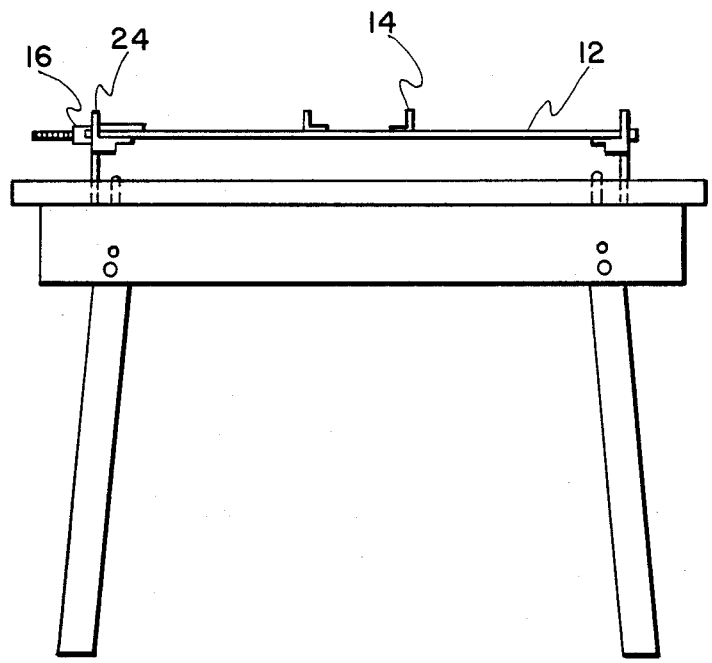
FIG. 3 is a front elevation view of the structure shown in FIGS. 1 and 2.

Applicant's invention relates to apparatus either employed or integral with conventional portable electric tools such as portable electrical circular saws, routers, saber saws, etc. to perform sawing, milling and other operations comprising but not limited to crosscut, rip, simple and compound mitering operations known to be performed by radial arm and sheetboard saws. FIGS. 1, 2, 3 and 4 show isometric, plan, front and side elevation views respectively of Applicant's inventive workshop apparatus that may be employed with a workbench. A circular rim 12, preferably made of iron or steel, as shown in more detail in FIGS. 2 and 6b is positioned upon a first pair of either flat or angle shaped rails 24 having a rectangular or "L" shaped cross-section. The circular rim 12, having a second pair of either flat or angle shaped rails 14 having rectangular or "L" shaped cross-sections affixed or attached to it in a parallel and spaced apart manner, is moveable upon the first set of rails and can be rotated. The circular rim 12 with the rails 14 can be rotatably positioned a full revolution of 360 degrees as illustrated in FIG. 2 wherein the dashed outline of the rails designated 14' is shown in a different position from rails 14. Clamping means 16, which can be any conventional clamp, holds the circular rim in a fixed position during any particular operation A conventional vernier positioning device 18 can be employed to accurately position the turntable thereby precisely orienting the turntable to a predetermined position of the tool. The circular rim 12, the rails 14, clamp 16 and vernier 18 are supported upon cantilever arms 22 extending from the rear of workbench 20 above workpiece 30 and which also serves the purpose of clamping the workpiece 30. Cantilever Arms 22 can be raised or lowered by conventional means. The workpiece 30 abuts moveable fences 32 which can be positioned anywhere on the surface 34 of workbench 20. The cutting tool (Not Shown) whether a portable electric circular saw, router, saber saw or other portable electric tool can be mounted between the rails 14 directly or mounted upon accessory equipment mounted upon the rails 14 as hereinafter described; said tool being supported and clamped on and to said rails or said accessory equipment. The invention also comprises integrating said tool with the accessory equipment, which is turn can be integrated into the circular rim as hereinafter described. It goes without saying that the invention also comprises structure wherein the said tool may be integrated into the circular rim functioning as a turntable. The depth of the cut made by the cutting tool is raised or lowered by either adjusting the depth of cut of the tool, or bearing down upon accessory equipment, which will be hereafter described, or by raising or lowering the height of the cantilever arms 22. The angle of the cut made by the cutting tool is implemented by positioning the circular rim 12.

FIGS. 5 illustrate an accessory piece of equipment that can be used on the second pair of flat or "L" shaped rails 14. Although not shown, ball bearings or other friction reducing means can be employed for easier movement of the accessory along the rails 14. Frames 36 and 38 are connected at one end by spring 40 as shown in FIG. 5a so that the tool (Not Shown) can be set up at a position above the workpiece 30 not shown until ready for use. This permits a more extended cutting operation by bearing down upon the tool and therefore compressing spring 40 of accessory equipment 42, as shown in FIG. 5b.

Figure 6A:
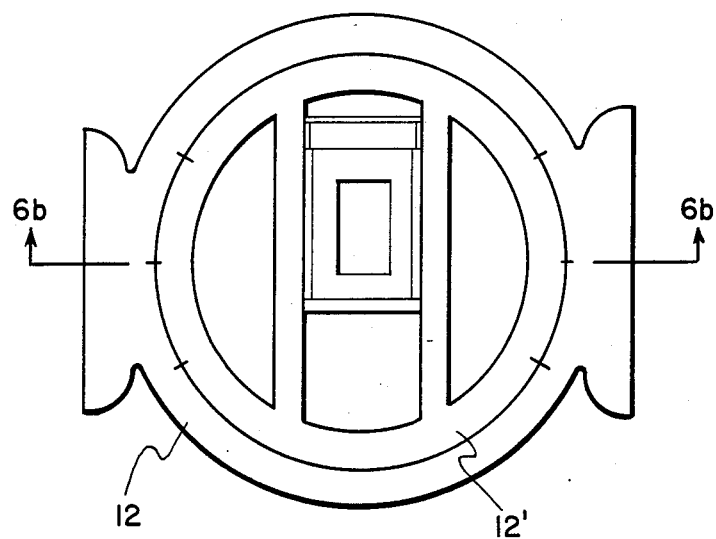
FIGS. 6 are plan and front partial elevational views of another embodiment of the invention shown in FIGS. 1, 2, 3, and 4.
Figure 6B:
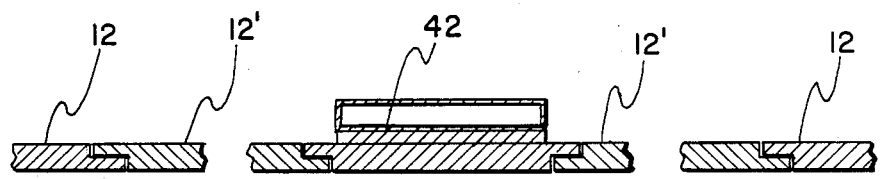

FIG. 6a is a plan view of another embodiment of applicant's invention shown in FIGS. 1, 2, 3, and 4, wherein a second circular rim 12' is positioned to rotate with the first circular rim 12 having the vernier positioning device 18 incorporated between the circular interfaces of the inner and outer circular rims.Although not specifically shown, applicant's invention embodies the unitary concepts of the portable electric tools being integral with either the accessory equipment 42 or the inner circular rim 12' or both, such as operation with a router employing templates.

Operation of the apparatus employing a portable electric tool is as follows:

A portable electric tool such as a circular saw is placed upon and between either the rails 14 or upon the accessory equipment 42 illustrated in FIGS. 5.

For a straight crosscut operation, the clamp 16 is loosened and the circular rim 12 ( or the inner circular rim 12' illustrated in FIGS. 6 ) is rotated so that the blade of the circular saw is orthogonal to the workpiece 30 placed in the workbench along fence 32 to be cut. The cantilever arms are adjusted for the right depth of cut for the workpiece 30 so that it will be unable to move upwards. The saw is turned on and the lumber is cut by moving the portable circular saw either along the flat or "L" shaped channels rails 14 directly or upon the accessory equipment 42 functioning as a carriage for the saw cutting across the lumber.

If the lumber is to be ripped, the clamp 16 is loosened and the circular rim 12 is rotated so that the blade of the portable circular saw 32 is parallel to the lumber being cut. The circular saw is clamped at the cutting position so that it does not move and the height of the cutting blade adjusted for the depth of cut by moving the cantilever arms 22. This clamping is implemented either by removeable "C" clamps (Not Shown), or other temporary fastening means. The saw is turned on and the lumber is fed into the rotating blade of the saw.

Any angle of cut from zero to 360 degrees is possible by using combinations of the foregoing procedures. Should complex compound mitre cuts be required, adjustments to the portable saw in addition to the foregoing operating procedures must be made. There is no limitations on the size of the lumber that can be handled by this apparatus. Cutting an eight foot by four foot panel presents no problem.

Pecise mitre cuts are made by use of the vernier positioning devices which accurately position the circular rim 12, and this in turn positions the flat or "L" shaped channel rails, insuring the precise positioning of the blade of the portable circular saw. Employing accessory 42 extends the use of the circular saw in areas not possible with prior art apparatus because the circular saw can be operating while at an angle from the surface of the rails and turntable. By employing the technique of pushing the saw down to the surface 34 while it is operating results in a cut into the workpiece from above the workpiece, and therefore extends the cutting range of the blade into areas such as the end zones where the cutting blade would encounter obstacles such as stops, etc.

An additional advantage results from the use of the double turntable embodiment shown in FIG. 6 when used with accessory equipment 42 shown in FIGS. 5. Not only are more precise cuts realized, but the circular rim 12' can be removed with the accessory equipment and the tool, and employed in places where the use of the portable workshop is not possible. It is possible to incorporate the tool into the inner circular rim turntable or incorporate the tool into the accessory equipment which in turn is incorporated into the inner circular rim turntable. An example of this envisions a router incorporated into the accessory equipment and this structure is incorporated into the removeable inner circular rim wherein a template for a door lock is formed.

Although only a limited number of embodiments of Applicant's invention have been illustrated, Applicant's invention is so limited, but is to be limited only by the breadth and scope of the annexed claims:

I claim:

1. A portable workshop for operating upon workpieces having means for the positioning of said workpieces comprising at least a pair of moveable arms for clamping said workpiece, a first pair of rails positioned upon said arms, a circular hollow rim positioned upon said first pair of rails for rotatable movement over the workpiece, and a second pair of rails affixed at their ends to said circular rim to form a turntable for operating a portable electrical tool mounted above said workpiece.

2. A portable workshop as claimed in claim 1 further comprising means for clamping said portable tool to said second pair of rails.

3. A portable workshop as claimed in claim 1 further comprising accessory means for mounting said portable electrical tool upon said second pair of rails for workshop operations.

4. A portable workshop as claimed in claim 3 wherein said accessory means for mounting said portable electrical tool comprises a pair of frames connected together by a hinge for permitting operation of said portable electrical tools from above said workpiece.

5. A portable workshop as claimed in claim 1 further comprising means for precise positioning of said circular rim.

6. A portable workshop as claimed in claim 1 further comprising means for the positioning of said workpiece.

7. A portable workshop having means for the horizontal positioning of workpieces comprising vertically moveable cantilever arms for positioning and clamping said workpieces, first supporting rails positioned upon said arms, a plurality of circular rims moveably positioned upon said rails within each other, second supporting rails affixed to one of said plurality of circular rims, and portable electrical tools moveably mounted upon said second supporting rails for performing workshop operations.

8. A portable workshop as claimed in claim 7 wherein said one of said circular rims having said second supporting rails affixed thereto is removeable.

9. A portable workshop as claimed in claim 7 further comprising moveable accessory equipment for mounting said portable electrical tools upon said second supporting rails.

10. A portable workshop as claimed in claim 7 wherein said one of said circular rims having said second supporting rails affixed thereto is integral with said portable electrical tools.

11. A portable workshop as claimed in claim 10 further comprising templates incorporated therein.

12. A portable workshop as claimed in claim 7 wherein said one of said circular rims having said second supporting rails affixed thereto is integral with accessory equipment.

13. A method for operating a portable workshop comprising the steps of placing a workpiece under cantilever arms, positioning said cantilever arms to prevent movement of said workpiece, positioning and clamping a circular rim turntable for portable electrical tools over said workpiece, and operating said portable electrical tools tool upon said workpiece.

* * * * *